United States Patent [19]
Petrov et al.

[11] 4,337,078
[45] Jun. 29, 1982

[54] SUBSTRATE FOR CULTIVATION OF AGRICULTURAL CROPS AND ROOTING OF GREEN CUTTINGS IN GREENHOUSES AND IN OPEN AIR

[75] Inventors: Georgi S. Petrov, Plovdiv; Ivan A. Petkov, Sofia; Hristo I. Etropolski, Sofia; Dimiter N. Dimitrov, Sofia; Nikolay N. Popov, Sofia; Atanas I. Uzunov, Sofia, all of Bulgaria

[73] Assignee: N P S K "Mineralagro", Sofia, Bulgaria

[21] Appl. No.: 208,491

[22] Filed: Nov. 17, 1980

[51] Int. Cl.³ .............................................. C05F 11/04
[52] U.S. Cl. ........................................ 71/24; 71/33; 71/53; 71/903; 71/904; 47/17
[58] Field of Search ............. 71/1, 11, 21, 24, 32, 71/33, 47, 53, 63, 903, 904; 47/58, DIG. 10, 17

[56] References Cited
FOREIGN PATENT DOCUMENTS

| 584382 | 10/1959 | Canada | 71/904 |
| 45-19605 | 4/1970 | Japan | 71/21 |
| 54-15865 | 6/1979 | Japan | 71/904 |

Primary Examiner—William F. Smith
Assistant Examiner—Ferris H. Lander
Attorney, Agent, or Firm—Karl F. Ross

[57] ABSTRACT

A substrate for the cultivation of plants in greenhouses or outdoors comprises klinoptylolite zeolite, vermiculite and peat in specified particle size ranges and relationships, with enhanced nitrogen and phosphorus content, to provide a highly versatile and surprisingly effective active growing medium.

1 Claim, No Drawings

SUBSTRATE FOR CULTIVATION OF AGRICULTURAL CROPS AND ROOTING OF GREEN CUTTINGS IN GREENHOUSES AND IN OPEN AIR

FIELD OF THE INVENTION

This invention relates to a mineral substrate for the cultivation of agricultural crops and the planting of green cuttings in greenhouses and in open air.

The substrate belongs to the group of the so called "active" substrate as it can give and accept considerable quantities of nutritious substances.

BACKGROUND OF THE INVENTION

Two types of substances for cultivation of agricultural crops are known: "active" which gives nutritious substances to the the plants and "inert" in which the nutrition of the plants is provided for by a nutritious solution.

An "active" type of substrate is known which consists of soil, peat and sand, mixed in different proportions and most frequently in proportions 1:2:1. It is the basic substrate used for the cultivation of strawberries and other crops in cultivating equipment.

For planting of green cuttings several kinds of substrates are known, consisting of peat, sand, perlite and vermiculite. Each of them is used independently or in combination with the rest of the above mentioned materials.

For the growing of strawberries in greenhouses an "inert" substrate was tried, this substrate comprising peat, moss and sand (recently vermiculte as well).

In practice on areas of considerable size an "inert" substrate is used and can comprise peat, perlite, wood filings, granules of cork oak and other light materials.

Plant nutrition in "inert" substances is carried out using the principle of hydroponics, i.e. through supply with nutritious solutions, prepared in advance. Of the so called "active" substrates one has been tried out in Bulgaria. Its constituents are soil, peat and sand in proportion 1:1:1.

Peat, sand and perlite are known to be used as substrates for the rooting of green cuttings. These materials are used either separately or in mixtures of peat and sand or peat and perlite in different volume ratios, e.g. 1:1, 2:1, 3:1, 1:2. In some countries sand, peat and vermiculite, pure or in mixtures, are used for the planting of green cuttings.

The disadvantage of the "active" substrates used in current practice is that they contain in small quantities some macro and microelements, easily accessible to the plants and yield them with difficulty. Besides they have high bulk weight and low porosity, the aeration of the medium is not very good; the nutritious substances accessible to the plants are not in quantities sufficient to provide for a high yield; the pH with the medium depends too much on the type of soil of which the substrate is combined. Such substrates are frequently infected with diseases and pests.

The disadvantage that "active" substrates contain small quantities of macro- and microelements which are yielded with difficulty is of peculiar importance when plants are rooted under artifical mist. Under these conditions some of the macro- and microelements are to a great extent washed from the leaves of the cuttings. As the plants cannot get them easily from the substrate, the results of the planting are not always good. The insufficient quantity of nutritious substances in the rooted plants predetermines the low percentage of rooting in the greenhouse.

The substances used in practice have low sorption ability and the nitrogenous, phosphorous and potassium fertilizers introduced into them are intensively washed away by the filtrating waters outside the rooting zone.

"Inert" substrates, though lighter and rather practical at first consideration, have several disadvantages as well: They require preliminary preparation and control over the concentration of the nutritious solution, expensive electronic equipment and highly qualified staff for the preparation and dosage of the solutions in the plant pots.

OBJECT OF THE INVENTION

The object of the invention is to provide a substrate for cultivation of agricultural crops and for green cuttings in greenhouses and in the open air, which contains considerable quantities of macro- and microelements in an easily accessible form and which possesses high sorption ability.

DESCRIPTION OF THE INVENTION

It has been found that a substrate for cultivation of agricultural crops and rooting of green cuttings is obtained when natural zeolite of the klinoptylolitic type is pounded, dried and fractionated into particle size fractions of 0.8 to 2.0 mm and 2.0 to 5.0 mm, in proportions of 1:1 to 2:1, mixed with vermiculite (raw, vermiculite size of the particles 0.0 to 1.0 mm and expanded to vermiculite to 5.0 to 15.0 mm in proportions of 1:9 to 2:8) and then mixed with organic matter such as peat.

The proportion between zeolite, vermiculite and peat is different depending on the crop to be cultivated. It may be from 10:0.01:0.01 to 5:2:3. The mixture is treated with ammonium nitrate fertilizer introduced as ammonium sulphate and superphosphate which give from 0.1 to 0.5% nitrogen and the same quantity of phosphorus.

The substrate has the following advantages: its sorption ability is several times greater; it contains a considerable quantity of macro- and microelements easily accessible to the plants, except nitrogen and phosphorous; it has high limit soil humidity; and it has low relative weight, which makes it possible for the substrate to be set up in vertical constructions like plant pots, polyethylene pipes. It has a high porosity, which ensures a very good water/air regimen for the plants; the reaction of the substrate in water is nearly neutral; it easily gives the nutritious elements to plants, like with the hydroponic method; it can be prepared under factory conditions; the process of watering is carried out without complex and expensive appliances for dosage and control. For these reason the substrate can be ready packed for sale.

The substrate is practically sterile as far as diseases and pests are concerned, because when the factors of natural klinoptylolite zeolites are processed, the drying of the material is carried out under a temperature of 250°–350° C.

The substrate gives the opportunity of cultivating of plants with a very good increase of epigeous mass and roots, with many germinations with high weight of each fruit and high yields per unit area.

The substrate also makes it possible to obtain rooted green cuttings with a very good increase and a good stock of nutritious substances. As a result of this the rooted cuttings adapt themselves much easier to the new conditions in the greenhouse when moved there from the substrate.

The substrate gives a higher percentage of rooted cuttings than those used in current practice and the biomass of the individual cutting is larger too.

SPECIFIC EXAMPLES

EXAMPLE 1

By the end of 1977 in the greenhouse of the Research Institute for Fruit-Growing in Plovdiv an experiment was carried out, aiming at the cultivation of strawberries and pepper on purely mineral zeolite substrate, treated in advance with ammonium sulphate and triple superphosphate. The substrate was strewn horizontally in a layer 10–15 cm. thick. In the period from December 6th to 23rd, 1977 on that substrate chilled strawberry seedlings of Redgountlet and Gorella varieties were planted. The rooting percent was very high- above 95%. The plants were watered regularly so that the normal humidity of the substrate should be maintained. The strawberries began to bloom in the first days of February and the first ripe fruit were gathered on 2 III 1978. Each plant (not thinned out seedlings) bore 120 gr. of the fruit on the average depending on the time of planting and the variety which amounted to 2.5–3.0 of strawberries from a decar having in mind that there were 25 thousand of plants on a decar. Part of the plants produced much more fruit- 165 to 215 gr. from a plant (of the Redgountlet variety). In May, when the strawberries had been gathered, on the same substrate pepper seedlings were planted ("Sivria" variety). 100% of the seedlings took root. The plants developed normally and bore a lot of fruit, about 2.5 tons per decare. The substrate on which the two crops were cultivated consisted of 100% natural klinoptylolit zeolite with the following chemical composition: silicon dioxide-70.5% dialuminum trioxide-11.0%, ferric trioxide-0.8%, calcium oxide-2.4%, magnesium oxide-0.6%, potassium oxide-4.0% sodium oxide-1.5%, microelements, manganese, copper, zinc, borum, titanium and others, total up to 1.0%, crystal water-8.7%.

The substrate contains two kinds of zeolite fractions: 0.8 to 2.0 and 2.0–50 mm in a proportion of 1:1. It has the following properties: sorption capacity-150 mg. ekv./100 g., bulk weight-0.85 g/cm$^3$; general porosity-65%, limit soil humidity-40%; humidity of wilting-20%; productive humidity-20%; pH-6,5. The substrate contains in exchange form the following cations: Ca$^{++}$-1%; K$^+$-0.3%; Na$^+$-0.3%; Mg$^{++}$-0.1%; mobile iron-0.3% mobile manganese-0.05% and others. It contains the microelements in an accessible form of Cu, Zn, Mo, B. Nitrogen and phosphorus have been introduced as ammonium sulphate and superphosphate, amounting to 0.2% active substance.

EXAMPLE 2

In the period October-November 1977 in the 5 decare greenhouse of NPBLK-Septemvri a large-scale experiment was started for the cultivation of greenhouse strawberries of the varieties "Cambridge-favourite", "Redgountlet" and "Gorella" on an organic-mineral substrate (50% fractionated zeolite, 5% raw vermiculite, 15% expanded vermiculite and 30% peat). A soil substrate, (soil:peat:sand-1:1:1) widely applied in the cultivation of strawberries in Bulgaria, was used for the control tests. The plants grown on the experimental substrate have greater number of flower-bearers and of germs, higher average weight of a fruit, the fruit ripen about 15 days earlier as compared to the control substrate. The varieties "Cambridge-favourite" and "Redgountlet" give higher yields, as Table 1 shows.

TABLE 1

| Substrate/variety | Flower-bearers on 1 plant | Flowers on 1 plant | Germs on one plant | Average weight of 1 fruit | Yield kg/dca |
|---|---|---|---|---|---|
| Cambridge-favourite | | | | | |
| experimental | 3.0 | 25.4 | 14.6 | 6.1 | 2100 |
| control | 2.8 | 21.0 | 12.4 | 6.1 | 1800 |
| Redgountlet | 3.2 | 20.4 | 9.6 | 8.4 | 2300 |
| experimental | 2.4 | 13.2 | 9.8 | 6.4 | 1600 |
| control | | | | | |
| Gorella | | | | | |
| experimental | 2.5 | 15.0 | 8.0 | 8.5 | 1700 |
| control | 3.0 | 17.8 | 11.4 | 6.9 | 1760 |

The data in the table can be obtained using the following exemplary substrate: natural zeolite-klynoptylolit fractional composition in weight correlation-15% fraction 0.8 to 2.0 mm; 25% fraction 2.0 to 5.0 mm and 10% fraction 5.0 to 8.0 mm +5% raw vermiculite 0.0 to 1.0 mm +15% expanded vermiculite 5.0 to 15.0 mm +30% organic mass-peat. The zeolite fraction is enriched with 0.2% nitrogen, introduced as ammonium nitrate and with 0.2% phosphorus, introduced as secondary superphosphate. The zeolite contains 70% klinoptylolite and has the following chemical composition: dialuminum trioxide-11.3%, silicon dioxide -69.0%, Fe$_2$O$_3$-0.9%, K$_2$O-3.8% Na$_2$O-1.5%, CaO-1.35%, MgO-0.6% H$_2$O-10.2%, manganese, zinc, titanium, copper, borum and other microelements-1.2% total; metabolic potassium-0.25%, metabolic calcium -0.9%, metabolic sodium-0.2%, metabolic magnesium-0.1%, metabolic manganese and iron-0.35%. Other ions in an accessible form, besides the above-mentioned ones, are: copper, zinc, molybdenum, borum and others. The vermiculite ingredient of the substrate has the following chemical composition: SiO$_2$-44.5%, Al$_2$O$_3$-15.2%, Fe$_2$O$_3$-13%, CaO-1.7%, MgO-14%, K$_2$O-5.0%, Na$_2$O-0.3%, ZnO-0.03%, ZnO-0.06%, Mo-0.0003%, Ni-0.02%, Cr, Co, V, Cu, Ca and others. The peat contains about 2% nitrogen, 0.3% phosphorus and 0.4% potassium. Just an insignificant part of these elements is in a state, easily accessible to the plants, namely in the order of 0.011% nitrogen, 0.005% phosphorus and 0.009% potassium. The substrate, described above can be used for the cultivation of strawberries in vertical constructions, as well, in greenhouses and in the open air. It has the following properties: bulk weight-0.650/cm$^3$; sorption capacity-100 m ekv/100 g, general porousness-75%, limit soil humidity-45%, humidity of wilting-20%, productive humidity-25%, pH-6.7.

EXAMPLE 3

In the summer of 1976 and 1977 in an agricultural experimental station of SSA-Gorubliane a substrate was tested for rooting of softwood fruit cuttings in the presence of artificial mist. The substrate consists of natural klynoptylolit zeolite and peat from "Baykal" deposit near Pernik in proportion 70:30. For the control experiments the following three substrates were used: peat-100%, peat and sand in volume proportion 1:1 and peat with perlite in volume proportion 1:1.

Natural zeolite was used, which had been dried at 300° C. and fractionated into three fractions. The proportion of these fractions is 0.8–2.0 mm-25%; 2.0–5.0 mm-35% and 5.0–8.0 mm-10%. The peat was strongly mineralized. River sand and agroperlite were used as well in particle size from 1 to 5 mm. In all substrates 0.1% nitrogen was introduced as an active substance as ammonium sulphate and 0.15% phosphorus as an active substance, introduced as double acid phosphate. In the control substrates 0.1% of potassium was introduced, too, as potassium sulphate.

The substrates were set in the rooting beds in a layer 15 cm. thick. Rooting of green cuttings from plum stocks "Microbolan-B" and "Damascena"-1869; from peach variety "Redheaven" and "Hale" and from ornamental roses variety "Don Juan" was carried out.

The cuttings were prepared in the usual way used in Bulgaria; they were cut 12 cm long; treated with 50% alcohol solution of Sindolylfatty acid with concentration 2 g/l and then planted at intervals of 4–5 cm with a 7–8 cm distance between the rows. 160 cuttings of each sort were set for each of the tested substrates i.e. in four repetitions with 40 numbers.

In the rooting beds periodically an artifical mist was injected for 5–10 sec at intervals of 60–80 sec. only during the day from 6.00 to 21.00 hours.

The cuttings were set in the second half of June and the results registered in the first ten days of October are given in the table 2 (% of the rooted cuttings, number of first rate roots on a cutting and growth of 1 cutting.) The data in the table show that the best results in the three respects are achieved with the experimental substrate. That applies to all varieties of plums, peaches and roses.

TABLE 2

| Plant variety and kind of the substrate | Rooted cuttings | First rate roots on 1 cutting number | Growth of 1 cutting-cm. |
| --- | --- | --- | --- |
| 1 | 2 | 3 | 4 |
| Mirobolan-B | | | |
| peat | 75.0 | 15.8 | 10.2 |
| peat + sand 1:1 | 83.7 | 21.1 | 13.3 |
| peat + perlite 1:1 | 83.8 | 22.6 | 15.1 |
| zeolite + peat 7:3 | 91.2 | 24.9 | 34.6 |
| Damascena-1869 | | | |
| peat | 77.5 | 18.0 | 6.0 |
| peat + sand | 81.0 | 19.7 | 8.1 |
| peat + perlite | 82.5 | 21.6 | 10.5 |
| zeolite + peat | 91.0 | 24.3 | 16.2 |
| Redheaven | | | |
| peat | 58.0 | 5.7 | 4.0 |
| peat + sand | 60.0 | 7.1 | 4.0 |
| Peat + perlite | 65.0 | 7.2 | 5.3 |
| Zeolite + peat | 82.0 | 9.3 | 8.5 |
| Hale | | | |
| peat | 57.5 | 5.9 | 3.8 |
| peat + sand | 57.5 | 7.5 | 4.0 |
| peat + perlite | 60.0 | 9.2 | 5.0 |
| zeolite + peat | 72.5 | 9.9 | 11.7 |
| Don Juan | | | |
| peat | 88.8 | 5.8 | 12.5 |
| peat + sand | 93.6 | 7.1 | 19.8 |
| peat + perlite | 95.0 | 7.3 | 19.9 |
| zeolite + peat | 95.0 | 8.5 | 23.8 |

On the zeolite-peat substrate a higher percentage of rooting of the cuttings was obtained, with larger biomass of each cutting and larger store of micro- and macroelements. The experimental organic-mineral substrate for rooting of softwood cuttings in the presence of artificial mist was composed of 70% zeolite-klynoptylolite with chemical composition similar to the above mentioned and 30% peat. The zeolite is present in three fractions: 0.8 to 2.0; 2.0 to 5.0 mm and 5.0 to 8.0 mm in weight ratio 35:25:10 and 30% peat. This substrate has the following properties: sorption capacity-110 m.ekv/100 g; bulk weight-0.8 g/cm$^3$; general porosity-65% top field humidity-43%; humidity of wilting 19%; productive humidity -24% and substrate pH during the rooting-6,7.

The substrate contains in metabolic form the following ions: $Ca^{++}$-1%, $K^+$-0.2%, $Na^+$-0.2%, $Mg^{++}$-0.1%, $Fe^{++}$-0.3%, $Ma^{++}$-0.05%.

It also contains in an easily accessible state ions of copper, zinc, borum, molybdenum and other microelements. In the substrate 0.25% nitrogen is introduced in the state of ammonium sulphate and 0.15% phosphorus in the state of superphosphate.

What we claim is:

1. A substrate for the cultivation of agricultural crops and the rooting of green cuttings in greenhouses and in the open air, consisting essentially of klinoptylolite natural zeolite dried at 250° to 350° C. and in particle size fractions of 0.8 to 2.0 mm, 2.0 to 5.0 mm and 5.0 to 8.0 mm respectively in proportions from 1:1:0.01 to 2:3:1, enriched with nitrogen and phosphorus in an amount of 0.1 to 0.5% by nitrogenous and phosphorous fertilizers; fractionated raw vermiculite in a particle size of up to 1.0 mm and expanded vermiculite with a particle size of 5.0 to 15.0 mm in a proportion of 1:9 to 2:8; and organic mass peat, the proportion of the zeolite:vermiculite:peat being from 10:0.01:0.01 to 5:2:3.

* * * * *